W. H. H. YOUNGS.
Fence-Post.
No. 199,949. Patented Feb. 5, 1878.
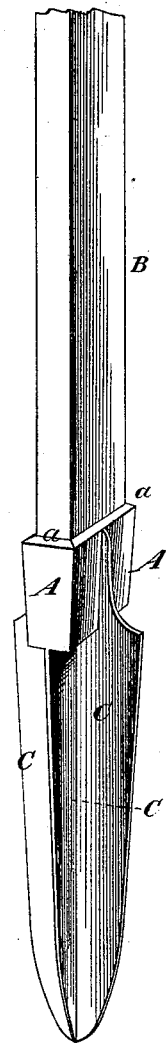
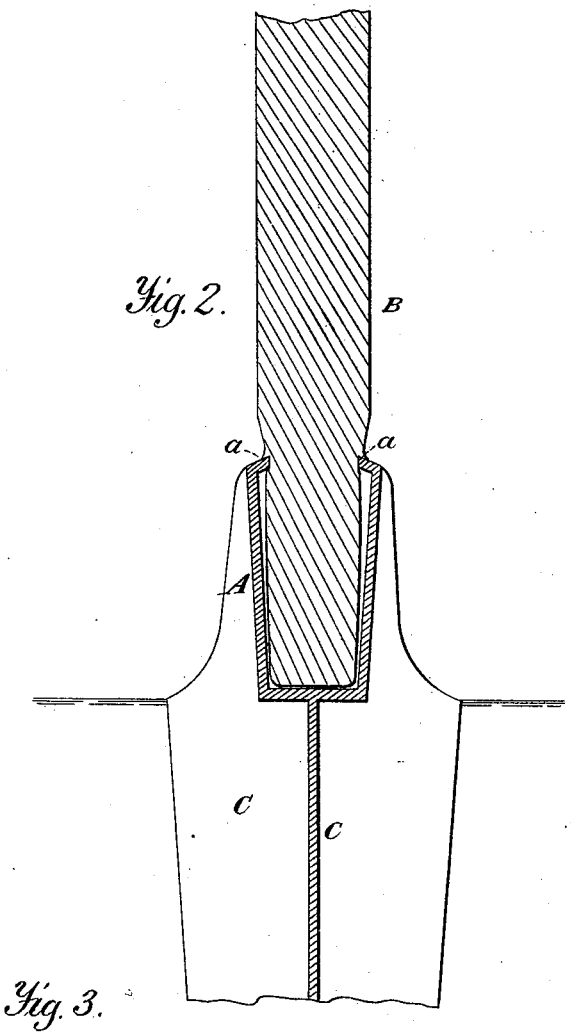
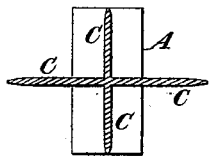
Witnesses.
A. Ruppert
Jas H. Lange
Inventor.
Wm H. H. Youngs
per Edson Bros.
Att'y

UNITED STATES PATENT OFFICE.

WILLIAM H. H. YOUNGS, OF WAVERLY, IOWA.

IMPROVEMENT IN FENCE-POSTS.

Specification forming part of Letters Patent No. 199,949, dated February 5, 1878; application filed December 14, 1877.

*To all whom it may concern:*

Be it known that I, WILLIAM H. H. YOUNGS, of Waverly, in the county of Bremer and State of Iowa, have invented certain new and useful Improvements in Fence-Posts; and I do hereby declare that the following is a full, clear, and exact description of my invention, which will enable others skilled in the art to which it appertains to make and use the same, reference being had to the accompanying drawings, and to letters of reference marked thereon, which form a part of this specification, and in which—

Figure 1 is a perspective view of my improved fence-post socket. Fig. 2 is a vertical section thereof, and Fig. 3 is a transverse section of the same.

Corresponding parts in the several figures are denoted by like letters.

This invention appertains to certain improvements in fence-post sockets; and it consists in forming the socket with inwardly-projecting pointed flanges, and in casting or providing the socket with tapering blades standing at right angles to each other, and extending from the lower end of the socket, substantially as hereinafter more fully set forth.

As heretofore constructed, this class of sockets allowed water from rain, &c., to enter the same, in order to permit of the escape of which they had to be provided with an outlet for that purpose. These objections or defects are overcome by my invention.

In the annexed drawings, A refers to a socket, preferably of a rectangular tapering form, and adapted to receive the fence-post B. The upper edges of this socket are provided with inwardly-projecting flanges $a\,a$, which are pointed upwardly, as seen in Fig. 2. It will be seen, on driving the post B into the socket and past its flanges $a\,a$, that these will penetrate the post, as seen in the last-mentioned figure, causing the post to spread at that point, and thus produce a water-tight joint, to exclude the rain, snow, &c. This, of course, obviates the necessity of providing the socket with outlets for the escape of water. This socket is cast or formed with tapering right-angled blades C C, extending from the lower end of said socket, and are for the purpose of anchoring the socket in the ground.

Having thus described my invention, I claim and desire to secure by Letters Patent—

1. The fence-post socket A, having the inwardly-projecting pointed flanges $a\,a$, substantially as and for the purpose set forth.

2. The fence-post socket A, made tapering from above downward, and having inwardly-projecting flanges $a$, substantially as shown and described.

3. A fence-post support consisting of the tapering socket A, having inwardly-projecting flanges $a$ and tapering right-angled blades C C, substantially as shown and described.

In testimony that I claim the foregoing as my own I affix my signature in presence of two witnesses.

WILLIAM H. H. YOUNGS.

Witnesses:
L. M. SHOLES,
C. E. CHANDLER.